United States Patent [19]

Ellsworth

[11] Patent Number: 5,316,480
[45] Date of Patent: May 31, 1994

[54] PORTABLE MULTIPLE MODULE SIMULATOR APPARATUS

[76] Inventor: Thayne N. Ellsworth, 3838 McGonigull, Boise, Id. 83703

[21] Appl. No.: 16,117

[22] Filed: Feb. 10, 1993

[51] Int. Cl.$^5$ .............................................. G09B 9/00
[52] U.S. Cl. ........................................................ 434/29
[58] Field of Search ................... 434/30, 32, 34, 35, 434/37, 38, 44, 47, 29; 472/59, 60, 61, 130

[56] References Cited

U.S. PATENT DOCUMENTS

| | | |
|---|---|---|
| 779,329 | 1/1905 | Thompson . |
| 1,005,061 | 10/1911 | Murie . |
| 1,159,981 | 11/1915 | Müllner . |
| 1,232,407 | 7/1919 | Thome . |
| 1,352,841 | 9/1920 | Silver . |
| 1,445,369 | 2/1923 | Terry . |
| 1,543,892 | 6/1925 | Willard . |
| 1,789,680 | 1/1931 | Gwinnett . |
| 1,949,414 | 3/1934 | Foulk . |
| 2,364,363 | 12/1944 | Howell . |
| 2,579,177 | 12/1951 | Miles . |
| 2,822,720 | 2/1958 | Douglas . |
| 2,861,806 | 11/1958 | Disney . |
| 2,941,333 | 6/1960 | Kudlik . |
| 3,089,257 | 5/1963 | Goodwin . |
| 3,131,487 | 5/1964 | Lyon et al. . |
| 3,295,223 | 1/1967 | Zelf et al. . |
| 3,468,533 | 9/1969 | House, Jr. . |
| 3,668,790 | 6/1972 | Wilton .................................. 434/38 |
| 4,066,256 | 1/1978 | Trumbull ............................. 272/18 |
| 4,164,080 | 8/1979 | Kosydar et al. . |
| 4,251,140 | 2/1981 | Fogerty, Jr. ........................ 352/132 |
| 4,391,514 | 7/1983 | Webster ............................ 434/38 X |
| 4,417,706 | 11/1983 | Miller ............................... 434/37 X |
| 4,526,548 | 7/1985 | Livingston ......................... 434/226 |
| 4,599,645 | 7/1986 | Brown et al. ...................... 358/104 |
| 4,634,384 | 1/1987 | Neves et al. ....................... 434/44 |
| 4,767,334 | 8/1988 | Thorne et al. ..................... 434/29 |
| 4,874,162 | 10/1989 | Trumbull et al. .................. 272/18 |
| 5,004,225 | 4/1991 | Krokovski ......................... 472/60 |
| 5,137,450 | 8/1992 | Thomas ............................ 434/44 |

Primary Examiner—Gene Mancene
Assistant Examiner—Jeffrey A. Smith
Attorney, Agent, or Firm—Delbert R. Phillips

[57] ABSTRACT

A method and apparatus are disclosed for multi-media simulation of the sounds, sights, and motions associated with various real life experiences. Roadable trailers having modules are combined to form a platform or support for an exoskeleton in the shape of various structures such as a spaceship, moon base, cave, mountain, vehicle, airplane, helicopter, ship, submarine, etc. The modules are provided with cameras, viewing screens, audio equipment and actual and optical motion imparting mechanisms for real-time point-of-access imagery simulating take-off, landing, turns, and hover-type turns from the environment surrounding the simulator. External image gathering cameras are attached to a movable support to provide relative motion point-of-access imagery.

11 Claims, 16 Drawing Sheets

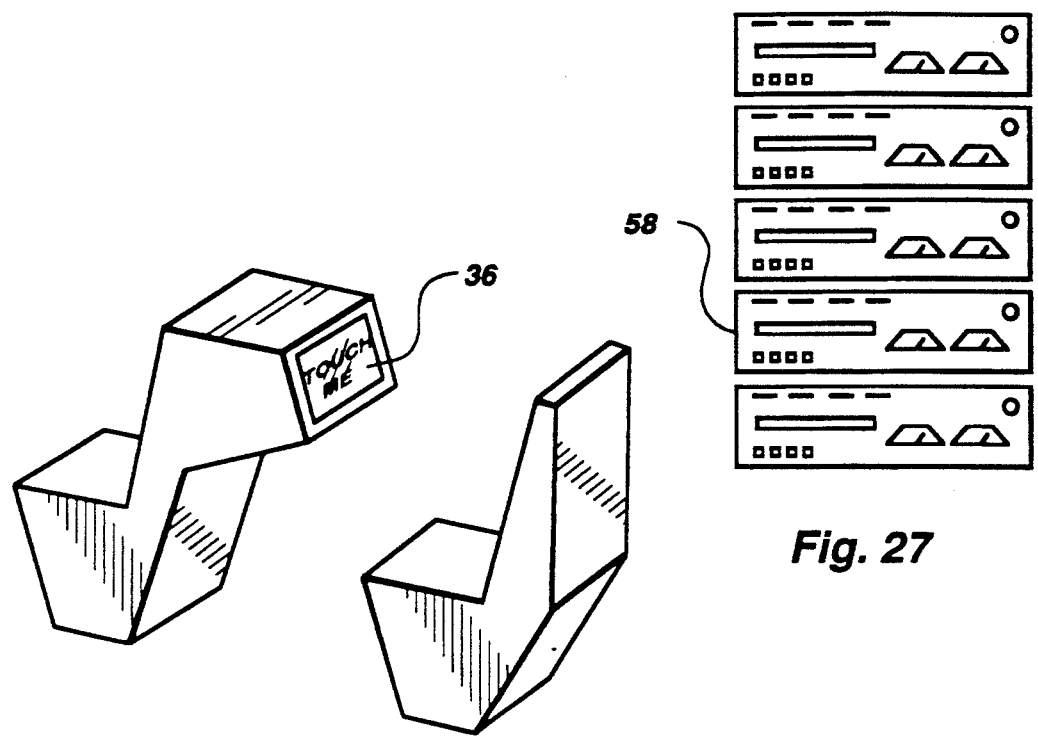
Fig. 27
Fig. 28
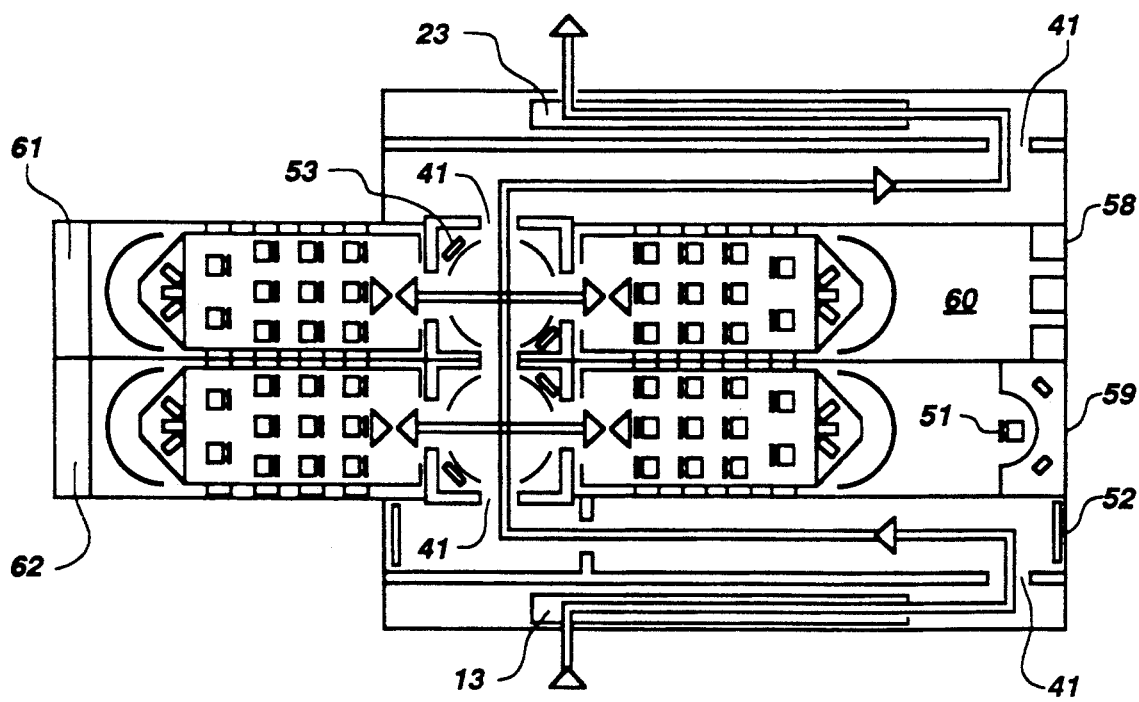
Fig. 29

PORTABLE MULTIPLE MODULE SIMULATOR APPARATUS

BACKGROUND OF THE INVENTION

1. Field of Invention

This invention pertains to a multi-media simulator that is portable. Multiple roadable trailers comprising the modules are attached together to form a platform that is covered by an exoskeleton which is formed in various shapes such as a spaceship, moon base, cave, vehicle, airplane, helicopter, ship, submarine, etc. The invention also pertains to a method of imparting real-time point-of-access imagery that simulates take-off, landing, turns, and hover-type turns from the environment surrounding the simulator. This imagery is accomplished by way of image gathering systems such as video cameras, infrared and ultraviolet cameras that are attached to supports on the exterior of the apparatus that move the image gathering systems; said means being located on the exterior of the apparatus.

2. Description of Prior Art

Over the past 200 years there have been many types of exhibits and apparatuses that have been designed to entertain and educate people using various concepts such as paintings, photography, slides, motion pictures, television, video recordings, holographs, etc. In the past, these exhibits and apparatuses have been both stationary and able to impart motion to give the patron a sense of movement in connection with the paintings, photography, slides, motion pictures, television, video recordings, holographs, etc. These exhibits and apparatuses have been part of amusement parks, carnivals, training, exhibits, and fairs.

There have been many types of apparatuses described which through visual or moving means attempt to provide a simulation of motion. U.S. Pat. No. 779,329 patented Jan. 3, 1905 to F. W. Thompson describes an amusement apparatus which is covered with canvas or other textile material to form the shape of an animal or reptile, through which people walk, the apparatus being constructed with a vibratory means. U.S. Pat. No. 1,159,981 patented Nov. 9, 1915 to Anton Mullner describes an entertainment apparatus in which people are seated, which can be in the form of an airplane cabin. A cinematic projection is projected on a horizontal and vertical screen which gives an illusion of ascending and flying by coordinating the scenes on the two screens. U.S. Pat. No. 1,445,369 patented Feb. 13, 1923 to Edwin A. Terry describes an amusement device, the structure being fashioned in the form of a Noah's ark, where patrons are admitted to walk through and be subjected to unusual and unexpected experiences due to the rocking of the structure and to the movement of the floor members. The device utilizes a pair of foldable false walls at each end of the ark which are hinged so that the four walls may be folded against the ends of the house structure and secured when the apparatus is stored or being transported to a show place. The device is built on top of a wagon. U.S. Pat. No. 1,543,892 patented Jun. 30, 1925 to Eugene King Willard describes a motion picture projector apparatus that is mounted in a motor truck or other vehicle body with a plurality of screens at the sides and rear end of the body. The same film is fed progressively through three projectors in order to show the same pictures or images on three screens. U.S. Pat. No. 1,949,414 patented Mar. 6, 1934 to A. C. Foulk describes an airplane cockpit on the end of a boom which can be lowered or raised to give a simulation of taking off or landing in an airplane. U.S. Pat. No. 2,579,177 patented Dec. 18, 1951 to G. H. Miles describes a method of simulating or creating the impression of movement or travel by having a miniature scene that moves in front of a lens. The scene is then projected by means of optical mirrors through a tube where it is then viewed by a seated person. U.S. Pat. No. 2,941,333 patented Jun. 21, 1960 to Alex Kudlik describes an amusement device which simulates a trip into space by having a picture roll that turns and simulates take-off from a space port. The device, which sits on a table or desk, also has a simulated control panel which regulates the movement of the picture roll and produces sounds. U.S. Pat. No. 3,089,257 patented May 14, 1963 to R. H. Goodwin describes an apparatus which has a projection means for simulating aircraft take-offs and landings. It also has a system which controls the projection means by translating the movement of the simulated controls into movements of the simulated scene. U.S. Pat. No. 3,131,487 patented May 5, 1964 to F. Lyon et al. describes a pilot training simulator having aircraft controls which includes movement of a photographic panorama that is viewed through a series of lenses in order to give the illusion of flying. U.S. Pat. No. 4,767,334 patented Aug. 30, 1988 to Thorne et al. describes an educational and recreational toy which encloses a simulation of an airplane or other vehicle cockpit. The cockpit has an analog computer which controls a video screen in such a way that moving the controls changes the scenes on the video screen to give the illusion of control of the vehicle.

Theaters and other apparatuses have been created which provide a simulation of movement while the patron views a motion picture film slide show or video scenes in conjunction with such movement. U.S. Pat. No. 1,005,061 patented Oct. 3, 1911 to R. M. Murie describes a theater that has a chamber where the patrons are seated which moves up and down to give the illusion of movement in relationship to the screen, upon which scenes recorded from balloons, airships, and other aeronautical machines are projected. U.S. Pat. No. 1,232,407 patented Jul. 3, 1917 to L. Thome describes an amusement device in which persons seated in cages or gondolas pivotally supported are rocked to give them the effect and sensation of being carried through the air in an airship or aeroplane while viewing pre-recorded scenes of different countries and localities which are projected on a plurality of screens which can be viewed by the patrons. U.S. Pat. No. 1,789,680 patented Jan. 20, 1931 to James E. Gwinnett describes a rotatable platform adaptable to tilt in any direction and to be used in combination with a moving picture to accentuate action displayed in the picture such as a boat listing or an airplane banking for a turn. U.S. Pat. No. 3,468,533 patented Sep. 23, 1969 to W. J. House, Jr. describes an educational and amusement apparatus which rotates to provide a sensation of weightlessness at the same time as a moving scene is projected on a screen. The patrons are securely fastened against platforms that slide up in conjunction with the rotation of the apparatus. U.S. Pat. No. 2,861,806 patented Nov. 25, 1958 to Walter E. Disney describes a rocket ship amusement apparatus, housed in a building, which has viewing ports on the top and the bottom. In conjunction with the movement of the seats, films are projected which can be viewed through the ports giving the illusions of space travel. U.S. Pat. No. 4,066,256 patented Jan. 3, 1978 to D. Trumball provides an amusement apparatus which is mounted on hydraulic rams that gives the simulation of movement in conjunction with a scene projected on a screen inside the cabin of the apparatus. U.S. Pat. No. 4,164,080 patented Aug. 14, 1979 to Kosydar et al. describes a flight simulator that has visual projection means. The simulated flight compartment, electronic equipment, a visual display and maintenance walkway are all enclosed within an octagonal enclosure and mounted on a motion system. U.S. Pat. No. 4,251,140 patented Feb. 17, 1981 to Fogerty, Jr. describes a ride assembly for simulating travel which includes a motion picture film projector and a sound system which is coordinated with movement means for the cabin. U.S. Pat. No. 4,874,162 patented Oct. 17, 1989 to Trumbull et al. describes a motion picture amusement ride which provides a means of projecting scenes that are moving on a screen in coordination with up and down movements of the seats.

U.S. Pat. No. 1,352,841 patented Sep. 14, 1920 to H. A. Silver describes an amusement device within a building that permits the viewing, (on a screen of oiled tracing cloth, ground glass, paraffin impregnated cloth, or similar material), and hearing by means of a dictograph or loud speaking telephone, thus permitting the observation of the activities in an additional room below the room where patrons are seated.

The prior art shows apparatus and methods of camera movement for photographing various angles and positions. U.S. Pat. No. 2,364,363 patented Dec. 5, 1944 to S. Howell describes a mounting for cinematographic cameras which allows the camera to swing about an axis which may be either horizontal or vertical. U.S. Pat. No. 2,822,720 patented Feb. 11, 1958 to N. Douglas describes a method for coordinating the movements of the camera with the projector so that the stationary points in the scene remain stationary when projected by the moving projector.

There have been various methods of image generation and projection systems among which are the following: U.S. Pat. No. 4,599,645 patented Jul. 8, 1986 to Brown et al. which is drawn to a projection system for image generation, applicable in flight simulators. This system allows for projection onto very large screens, providing imagery for a projection system in which there is a dynamic earth/sky interface. U.S. Pat. No. 4,645,450 patented Feb. 24, 1987 to Graf et al. describes a computer controlled imaging system involving a digital image processing and display system which has the ability to compose and construct a display scene from a library of images with sufficient processing speed to permit real-time or near real time analysis of the images by a human operator or a hardware/software equivalent thereof. U.S. Pat. No. 5,137,450 patented Aug. 11, 1992 to Thomas describes a projection mechanism for a flight simulator which incorporates eight identically pentagon-shaped translucent rear-projection screens that are joined together at their edges to form a partial dodecahedron. Video projectors are mounted outside the partial dodecahedron to direct, through a mounted mirror-folded beam path, an appropriate simulator image to the rear of a pentagon screen. A simulator pilot views the simulated image from inside the partial dodecahedron.

There have been many training and simulator apparatuses conceived to provide actual hands on training. U.S. Pat. No. 3,295,223 patented Jan. 3, 1967 to J. D. Zeff et al. describes a mockup of a space capsule that is used for training astronauts in a closed environment which is similar to a space craft. U.S. Pat. No. 4,526,548 patented Jul. 2, 1985 to Livingston describes a mobile firefighter training trailer which has various rooms enclosed in one trailer. Smoke and flame generating devices are associated with the simulated furnishings of the rooms providing a means of training for firefighters.

None of the above patents suggest a portable multiple module simulator apparatus encompassing real-time point-of-access take-off and landing simulation devices, interactive video/computer systems, real-time and pre-recorded video/computer special effects, video/cinema special effects, lateral transport elevator simulators, virtual reality experiences, and retail marketing areas.

OBJECTS AND SUMMARY OF THE INVENTION

It is an object of the present invention to provide a portable entertainment and/or educational multiple module simulator apparatus which is formed from multiple roadable trailers that are attached together to form multiple simulator modules which can be used by 2 or more people.

It is a further object of the present invention to provide a portable simulator encompassing real-time point-of-access take-off and landing simulation devices, interactive video computer systems, real-time and pre-recorded video computer special effects, video/cinema special effects, gravity dampening simulators, and virtual reality experiences.

It is an additional object of the present invention to provide a portable simulator encompassing lateral transport elevator simulators between the multiple simulator modules.

It is yet another object of the present invention to provide a portable simulator encompassing a retail marketing area within one or more simulator modules.

It is a yet further object of the present invention to provide a portable simulator composed of multiple trailers covered with an exoskeleton, which resembles a spaceship, moon base, cave, vehicle, airplane, helicopter, ship, submarine, etc., alone or in combination with each other, which can be disassembled when the trailers are moved.

It is yet an additional object of the present invention to provide a means for movement of the simulator modules.

Another object of the present invention is to provide a portable simulator having a real-time point-of-access take-off and landing simulation which is accomplished by attaching imaging devices, such as video cameras, to boom platforms which are connected via closed circuit to a video screen or video screens in the simulator cabins.

These and other objects of the invention are accomplished by a portable multiple module simulator apparatus which comprises a platform consisting of multiple trailers that are attached together to form multiple simulator modules. The simulator modules can accommodate two or more people. These modules have means that provide visual, auditory, and motion stimuli which simulate various experiences. Continuous charging hydraulic systems provide means for movement that rock, raise, and lower each simulator compartment. The apparatus is designed to act as a "total experience" platform for the new "special venue" type cinema-simulator productions. Multiple trailers contain modules that simulate desired activities, for example, a spaceship ride. Each module can seat two or more people.

Patrons enter the apparatus by way of a ramp attached to an opening in a module on a trailer. The first module functions as a briefing and/or instructional area. The patrons then proceed into an area that simulates a decontamination chamber, which is part of the first module. After a short time they then proceed into one of two or more lateral transport elevator simulators, contained in seperate modules, which simulate transport between various levels of the spaceship, airplane, helicopter, ship, submarine, vehicle, or cave, etc. Said lateral transport elevator simulators are part of the multiple modules formed from the trailers. From these simulated elevators the patrons pass through simulated pressure doors into one of the two or more modules containing seating means and simulation means such as continuous charging hydraulic systems attached to the underside of the module floor, moving picture projection systems, video and/or holographic projection systems. These modules are programmed to show the same or different presentations. The programs are staggered so that people can be seated in the empty module while the program is running in the remaining modules. As the module completes the presentation, the patrons are guided into the simulated elevators where they exit out into the module that contains the retail marketing area. The patrons then exit the apparatus by way of a ramp attached to an opening in the trailer.

The multiple trailers are covered with an exoskeleton which is in the form of a spaceship, airplane, helicopter, ship, submarine, vehicle, or mountain, etc. The exoskeleton is selected from metal, wood, plastic, or other rigid materials and can have additional protrusions that give it the appearance of a spaceship, airplane, helicopter, ship, submarine, vehicle or mountain, etc. The exoskeleton can be painted or formed from materials which have the desired color and texture. The exoskeleton can be readily disassembled so as to fit on a flatbed trailer or other means of conveyance. The trailers comprising the module apparatus unit can be detached and moved from place to place. The trailers may also be placed in a parallel or circular configuration.

The video screens in the modules can be connected to video cameras mounted on moving platforms which have a 360 degree rotating base; the platform can be raised and lowered by a lifting means to give the illusion of take-off and landing in a real-time point-of-access manner. The platform on the lifting means also can be rolled from side to side and raised to a height of 20 or more feet. The patrons in the module experience a simulated lift-off from the areas surrounding the apparatus. After the simulated lift-off is complete, the video screens inside the module are switched to prerecorded tapes depicting areas around the take-off point and other various scenes such as space, planets, and other points of interest throughout and beyond the earth from the location of the apparatus to a predetermined destination, either on earth or in space. Shortly before the termination of the presentation, the video screens are switched back to the cameras or other projection systems of the lifting mechanism to give the sensation of landing.

As an optional feature of the simulator there may be a holographic generator which projects holographic images taken of the people inside the module. The holographic images are projected into the modules. This is to give the patrons the illusion they have been on a protracted space journey. Holographic projection systems can also be used to simulate communications with fictitious entities.

BRIEF DESCRIPTION OF THE DRAWINGS

FIG. 27 shows the random access library made up of CD ROM systems as well as VCR equipment.

FIG. 28 depicts the touch sensitive consoles that allow the passengers to play various roles in the flight deck simulator as well as access pre-recorded materials to enhance their experience.

FIG. 29 shows a basic configuration of the portable multiple module apparatus showing the positions of the modules, control units, entrance ramp, exit ramp, and the flow of patrons.

DESCRIPTION OF THE PREFERRED EMBODIMENT

The preferred embodiment of the invention takes the form of a vehicle. The example shown is to a spaceship. This particular configuration is approximately 90 feet long and 45 feet wide with a tip of the vertical stabilizer height of about 25 feet and composed of six trailers fastened together to form one unit.

Figure 14:
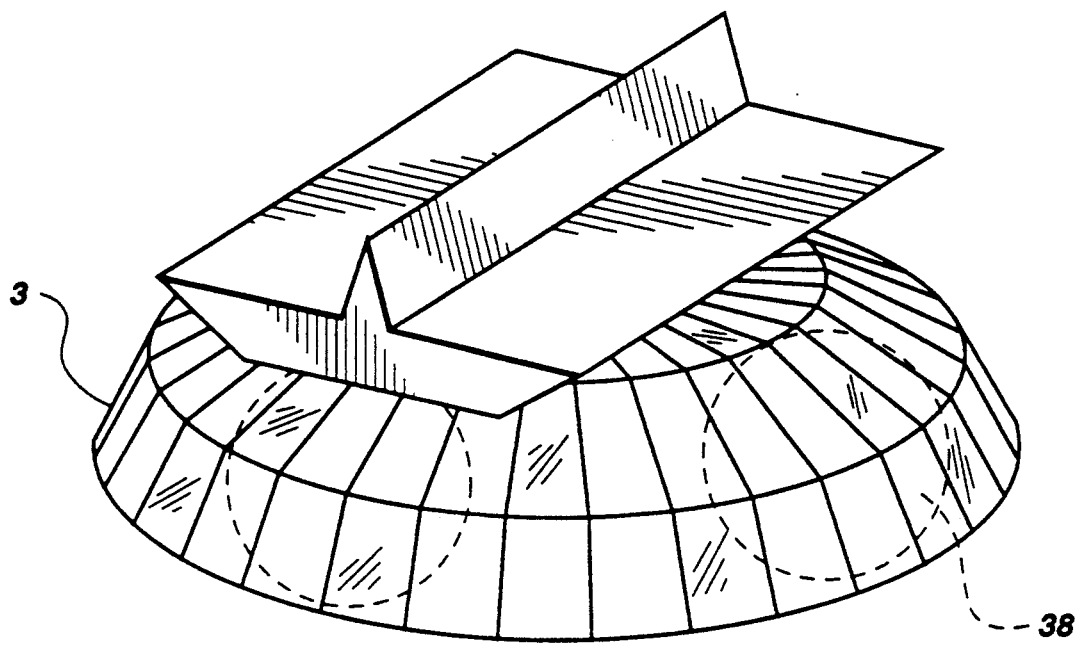
FIG. 14 depicts the support "thruster" risers designed to provide a strong base upon which to place the tires of the trailer/vans.

The assembled apparatus platform (FIG. 12) is made up of roadable trailers (10, 11, 20, 19, 17, and 18) joined together in a multiple module configuration and elevated on support thruster risers (3) on which the trailer wheels (22) rest. The support thruster risers (see FIG. 14) are designed primarily to provide a strong base upon which to place the tires of the trailers. They also have translucent panels surrounding the support thruster risers (3) which are illuminated in conjunction with simulated take-off sounds such as turbines and thrusters. Also installed in the support thruster risers (3) are large industrial fans (38) which provide an added dimension of realism to the take-off and landing simulation. The wheels of the trailers can be covered with material to camouflage them. Individual trailers can be lifted into place by means of portable cranes or other movement means such as jacks or ramps.

The exoskeleton (1) is a light-weight structure that can be removed and transported in one piece. Additional exoskeleton parts such as the flight deck exoskeleton (12), wings (2), vertical stabilizers (7), rear engine pods (8), folding wing cover panels (16), support thrusters (3), and tire covers (9) which cover the trailer wheels (22), all of which can be removed in one-piece units or are collapsible, as in the case of the wings (2), and transported on means such as trailers or flatbed trucks. (See FIGS. 9, 10, 11, and 12).

Figure 1:
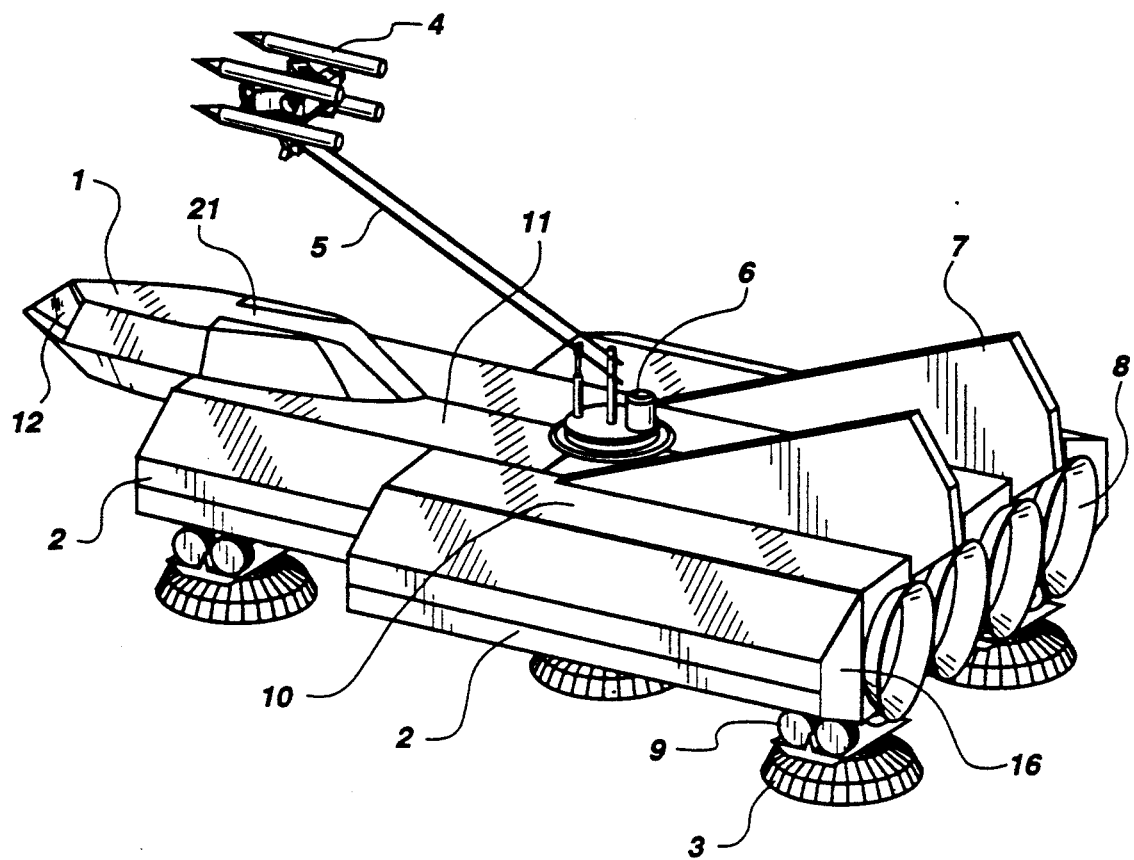
FIG. 1 shows a fully assembled portable multiple module apparatus as it might appear in a simulated spaceship configuration.
Figure 2:
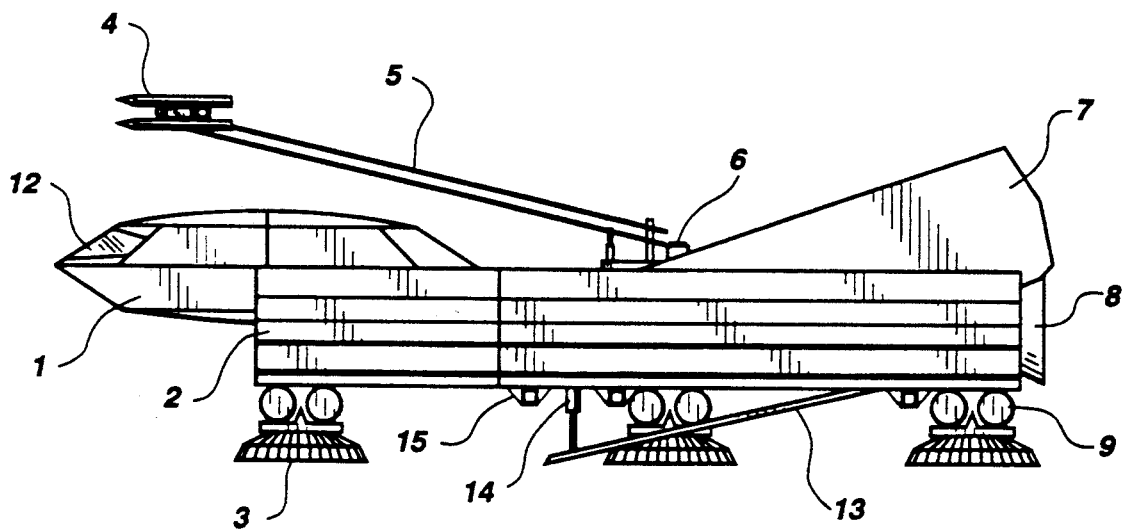
FIG. 2 is a depiction of a side view of the fully assembled portable multiple module apparatus.
Figure 3:
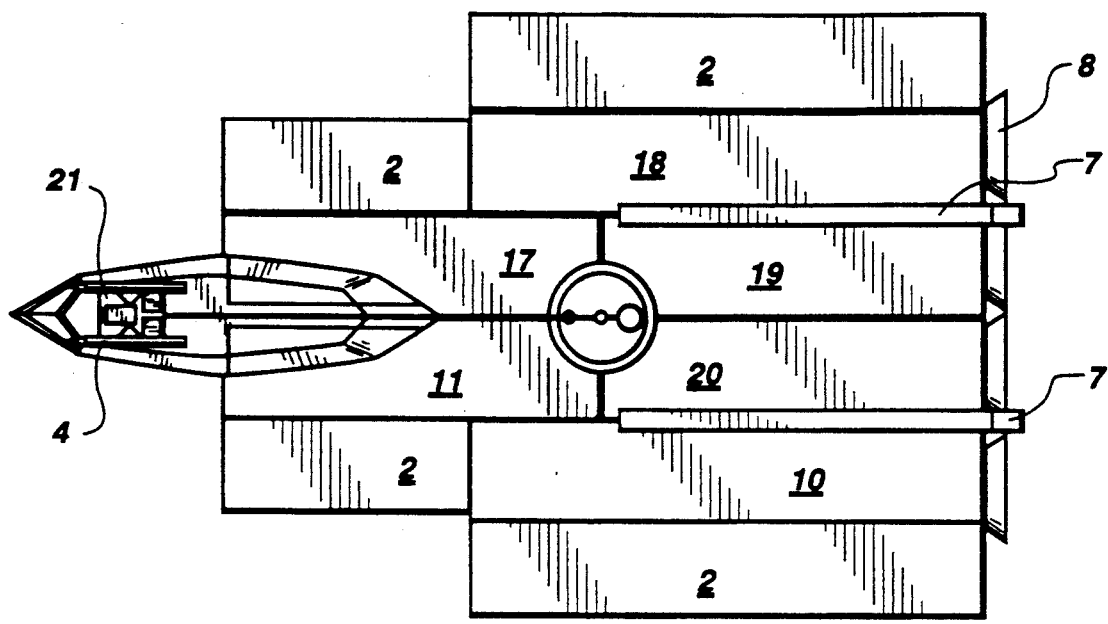
FIG. 3 shows an overhead view of the apparatus with each of the trailer units itemized to differentiate them from the props which adorn the main platform.
Figure 4:
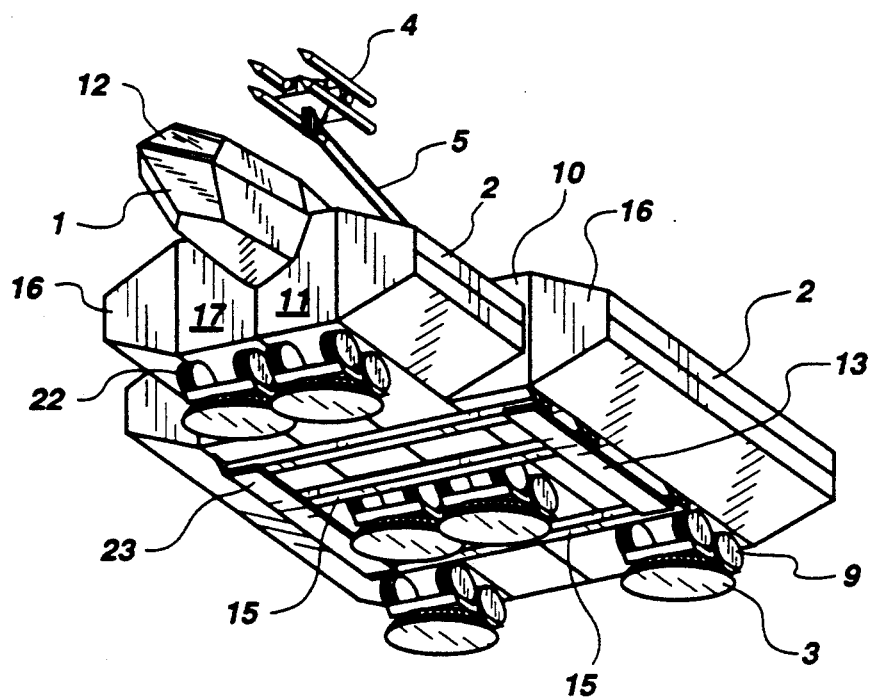
FIG. 4 depicts a bottom view of the assembled portable multiple module apparatus which shows both the entrance and exit ramps in the closed positions.
Figure 5:
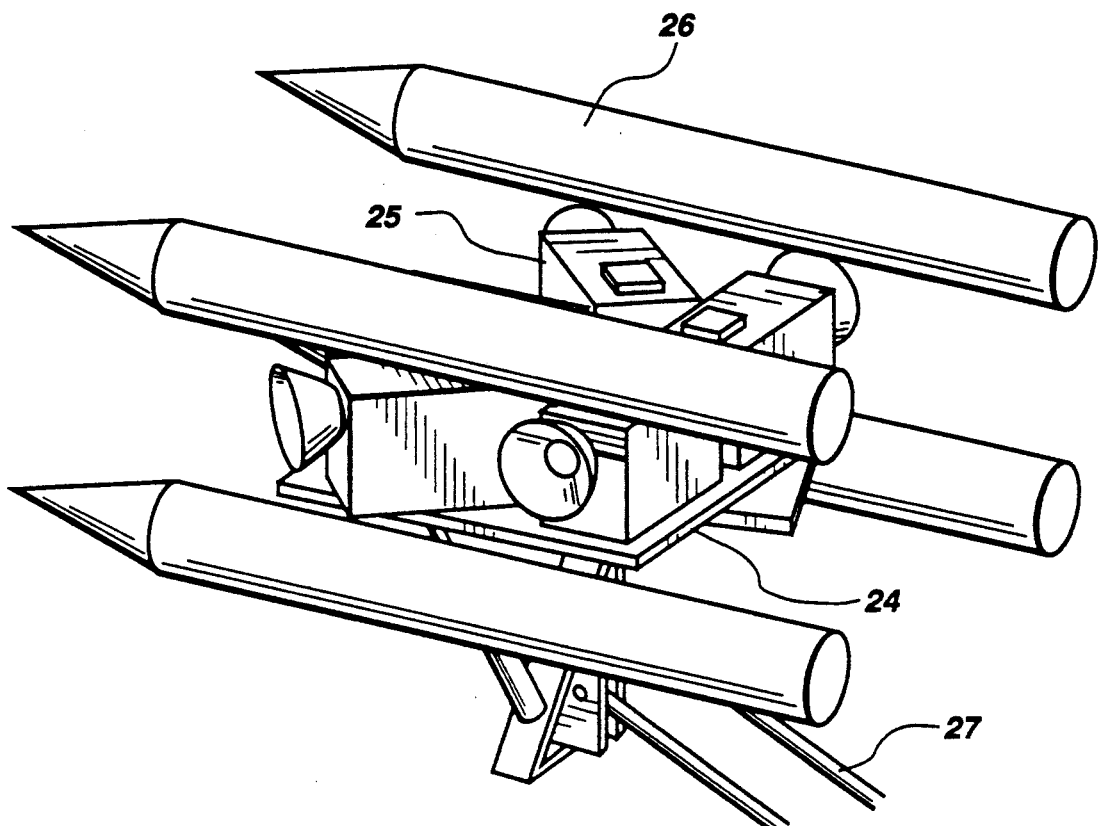
FIG. 5 shows the video cameras sitting atop the camera platform and surrounded by fake missiles in such a way as to camouflage the cameras but not interfere with their image gathering function.
Figure 6:
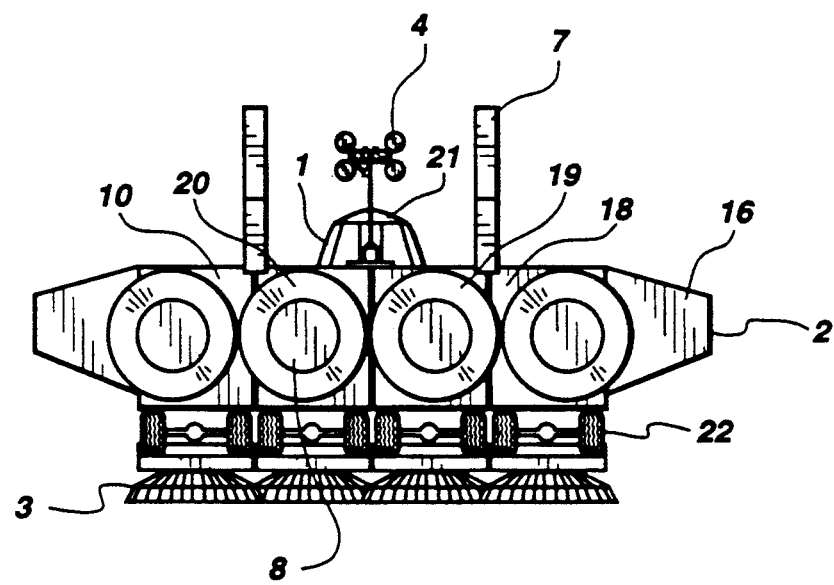
FIG. 6 depicts a view of the exoskeleton, from the rear of the apparatus, showing the main drive engines and the missile launch platform in a slightly raised position.
Figure 7:
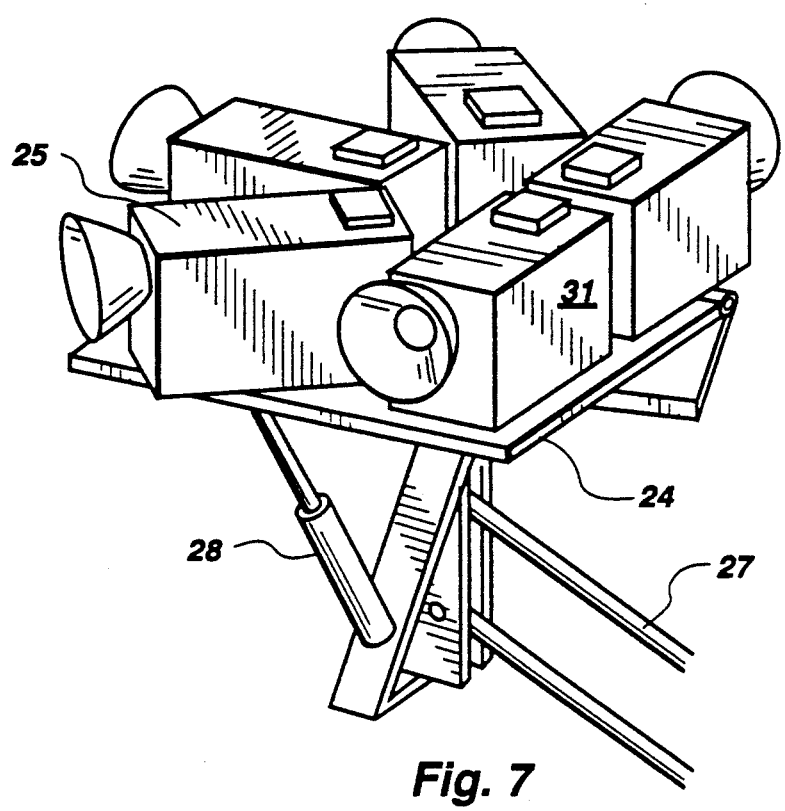
FIG. 7 shows the camera platform having multiple video cameras attached to the top.
Figure 8:
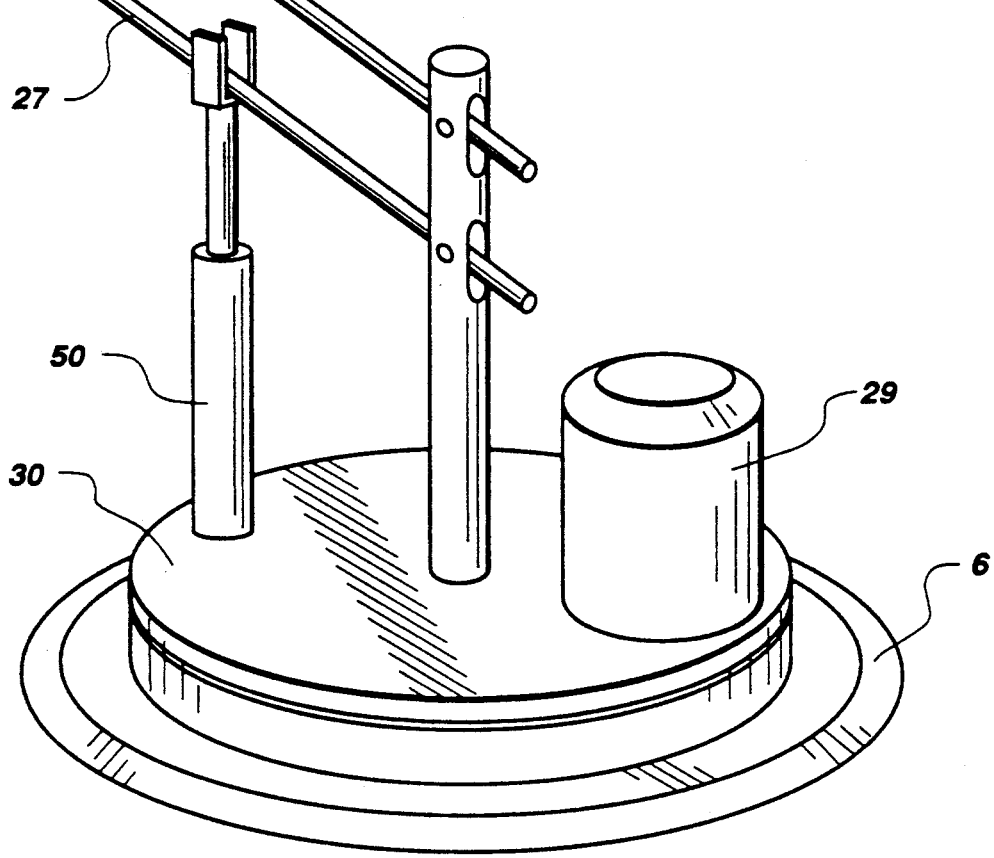
FIG. 8 depicts the camera platform boom base.
Figure 9:
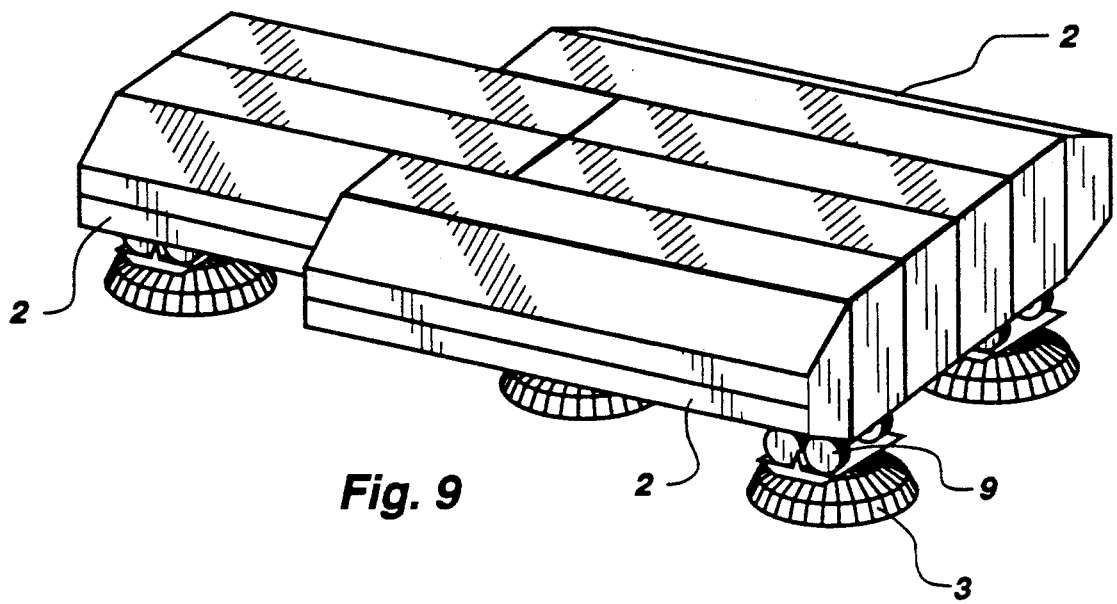
FIG. 9 shows the trailer modules of the apparatus attached together showing all of the exoskeleton removed excepting the wing and support "thruster" props.
Figure 10:
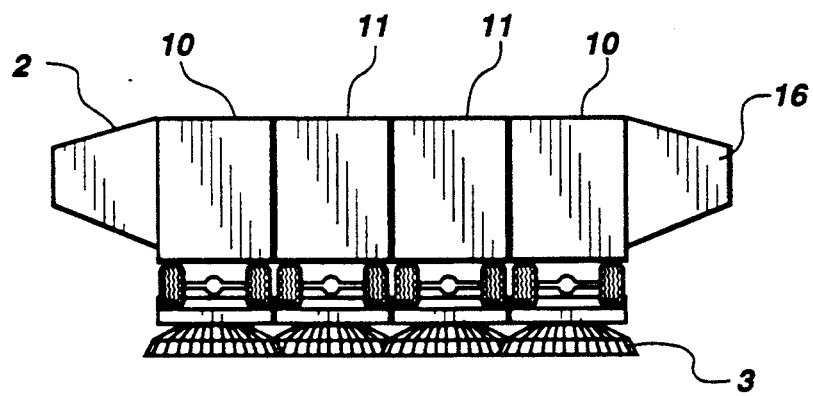
FIG. 10 depicts a rear view of the apparatus showing all of the exoskeleton removed excepting the wing and support "thruster" props.
Figure 11:
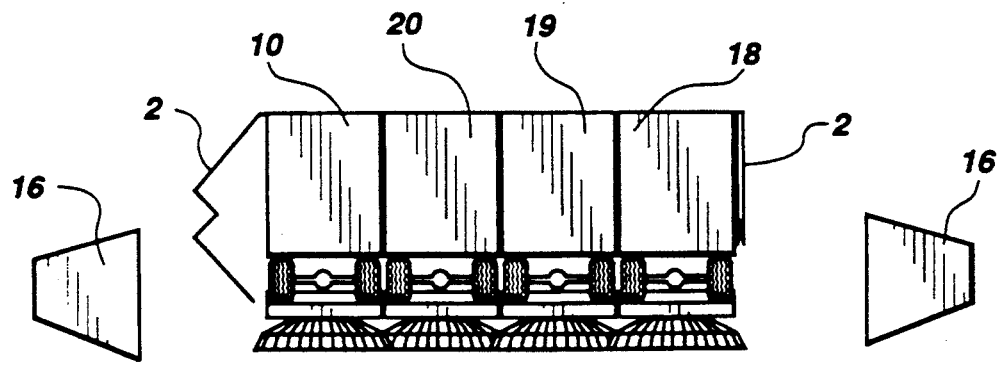
FIG. 11 shows the disassembly and folding up of the wing panels of the apparatus.
Figure 22:
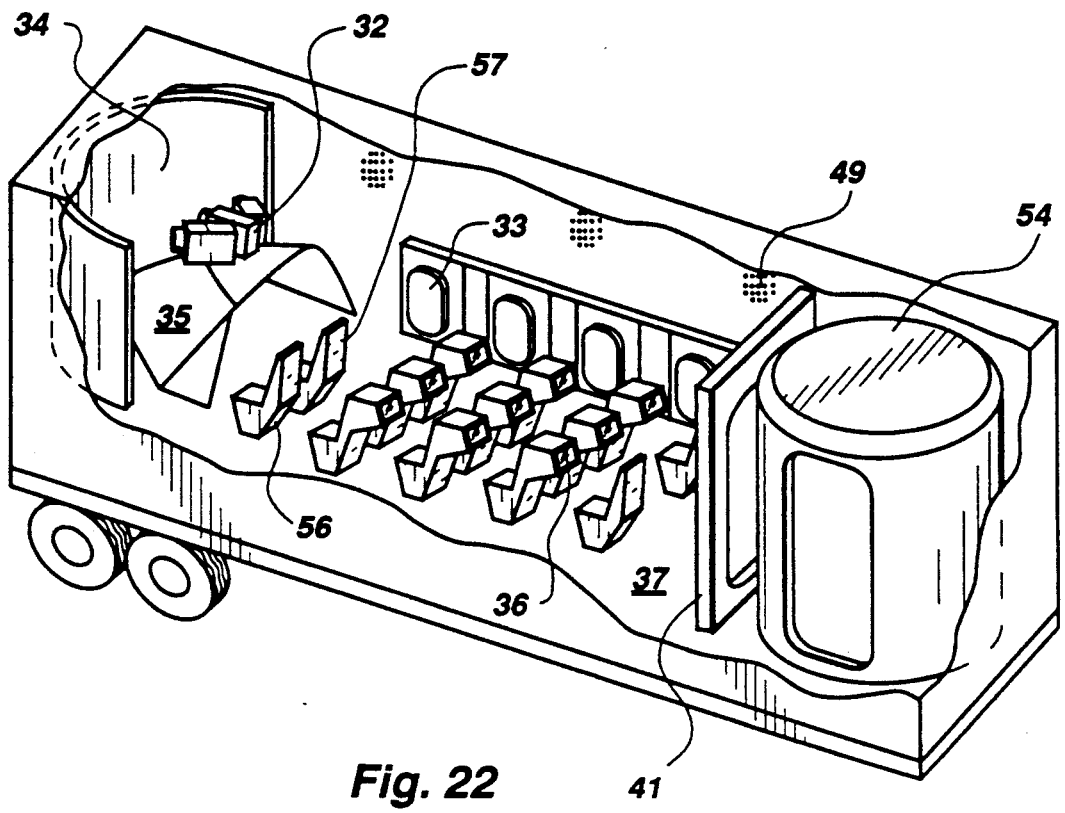
FIG. 22 depicts a cutaway of the larger trailer containing a flight deck simulator module with seats, video screens and control consoles.
Figure 23:
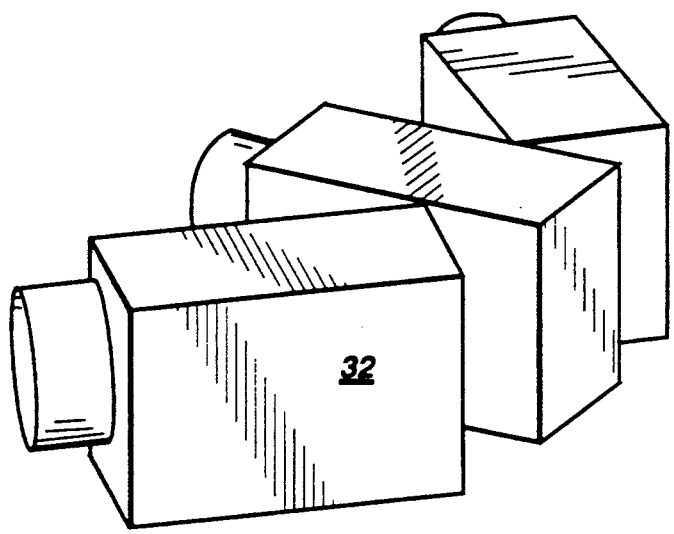
FIG. 23 shows a flight deck forward projection system.

The missile platform receptacle (21) containing the camera platform (24) on which cameras (25) are mounted is camouflaged as a missile launch platform (4), having simulated missiles (26), (see FIGS. 5 and 6) and is mounted on the camera boom (5) composed of two parallel support means (27). Said parallel support means are attached to the rotatable boom base (6) (see FIGS. 4 and 5). The camera platform boom system (27) is designed to maintain a stable platform for the cameras at any height. The fake missiles are positioned in such a way as to camouflage the cameras but not interfere with their image gathering function (see FIGS. 7 and 8). These devices allow real-time closed circuit video imaging to be projected in the flight deck simulator (FIGS. 22 and 23). As the camera platform is moved illusions of real-time take-offs, landings, turns, and banks are created and fed to the video screens in the modules of the apparatus (see FIGS. 30 and 31).

Figure 24:
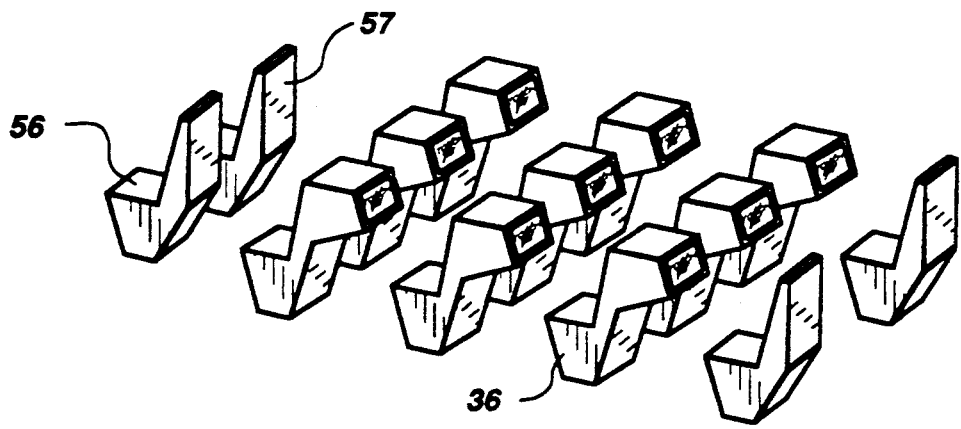
FIG. 24 depicts the seating arrangement in the flight deck simulator.
Figure 25:
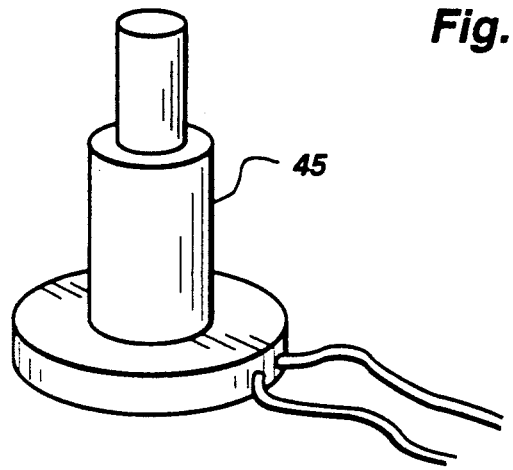
FIG. 25 shows the continuous charge hydraulic ram systems that are attached underneath the multiple modules trailers to give the sensation of movement.
Figure 30:
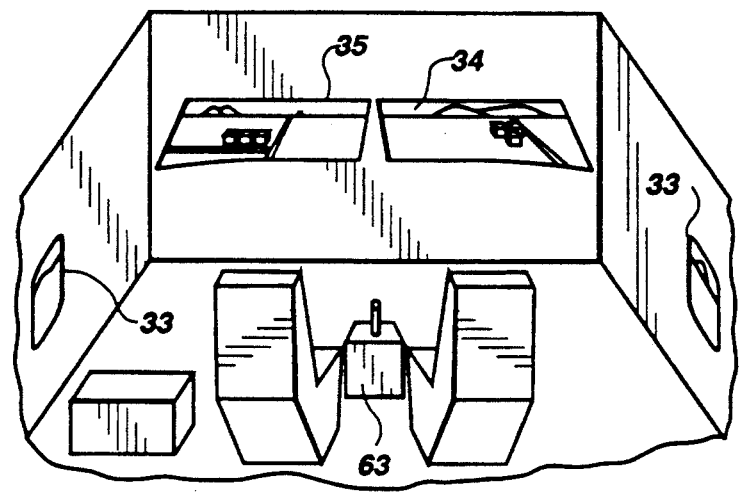
FIGS. 30 thru 34 depicts various views of the horizon at different camera positions as seen from the interior of the flight deck looking forward through the simulated cockpit window (video screens) and on video screens to the left and right of the patrons, as the video cameras (located on the booms on the exterior of the apparatus) assume various positions to simulate different maneuvers of the apparatus.
Figure 31:
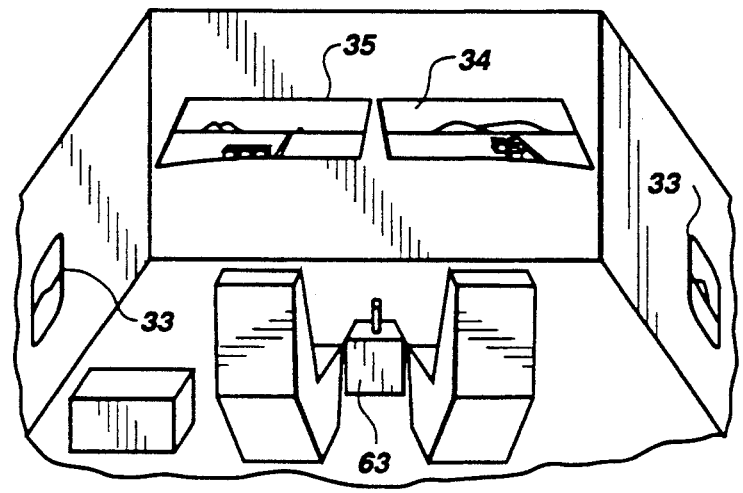
Figure 32:
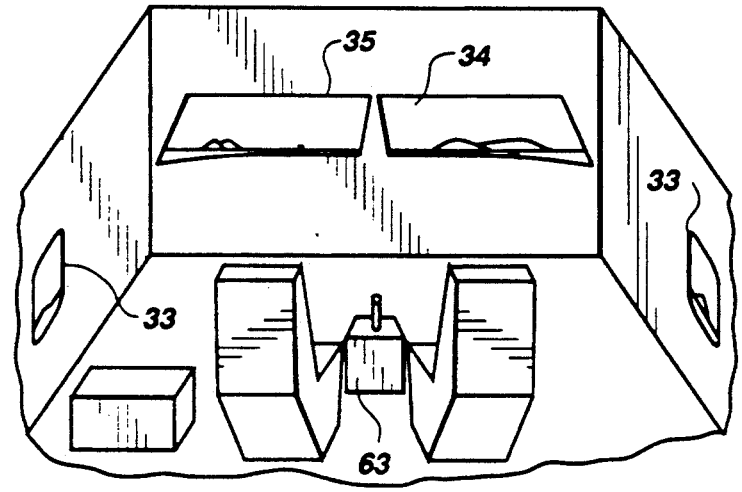
Figure 33:
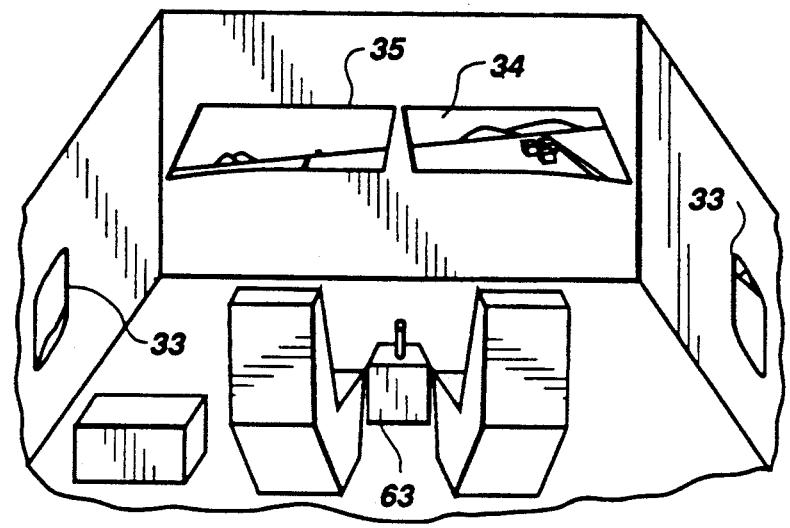
Figure 34:
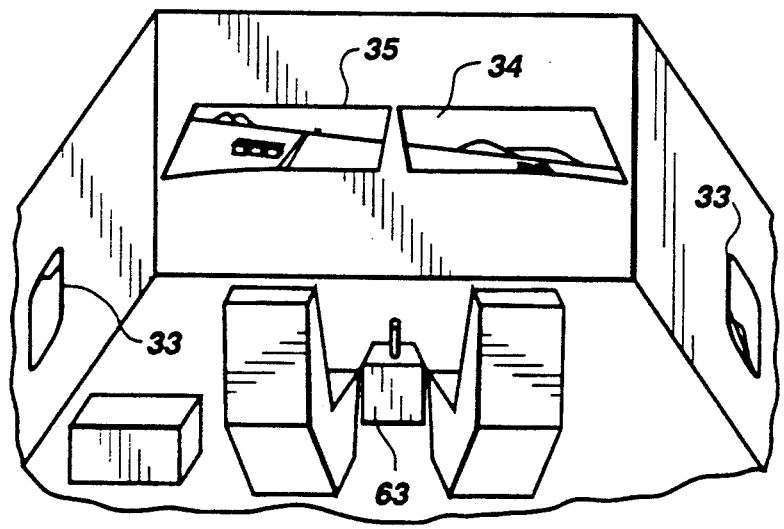
Figure 35:
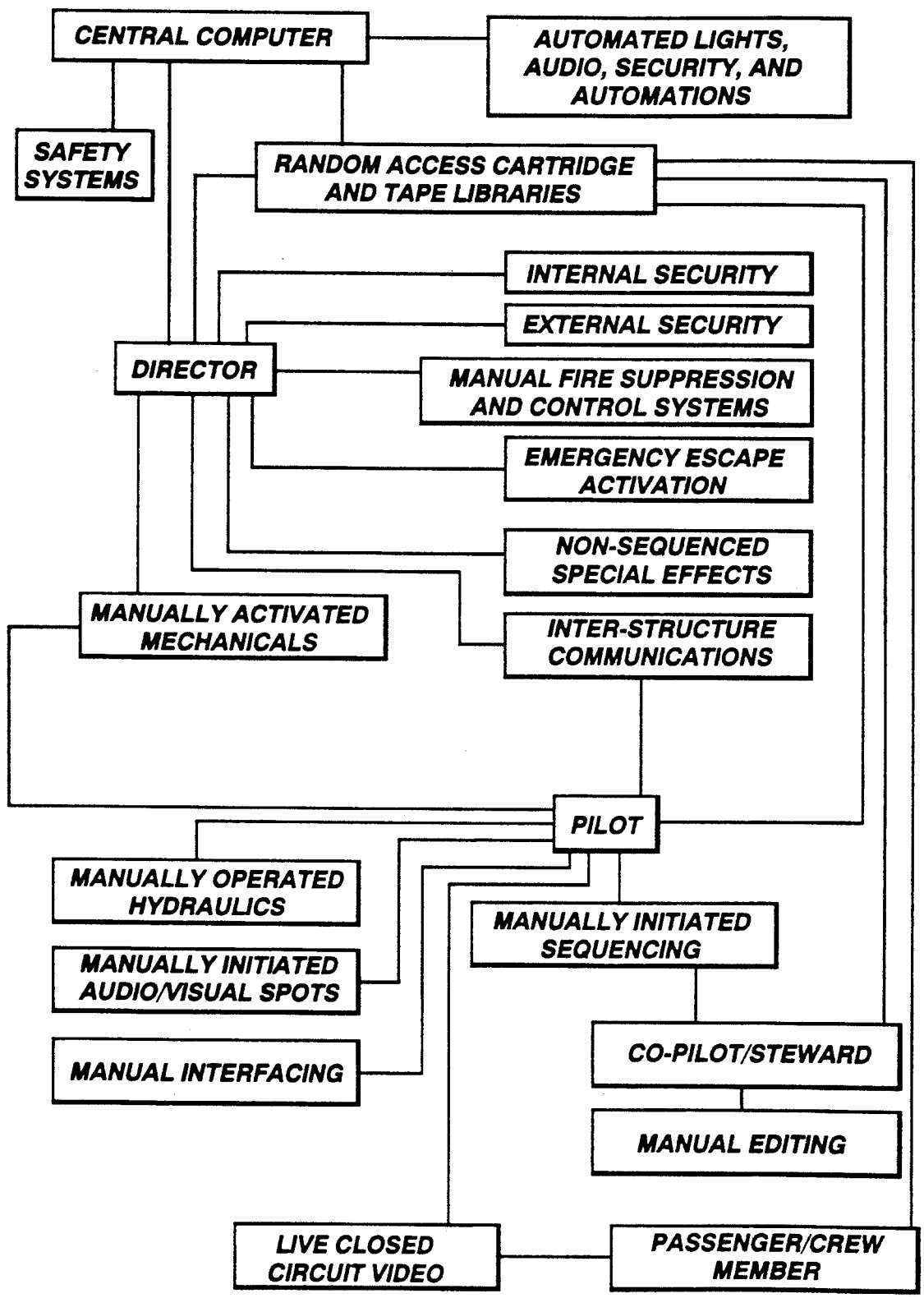
FIG. 35 shows a flow chart diagram of operators and operations involved in the portable multiple module apparatus.

The camera platform (24) has a multiple camera array (25 and 31) fastened to it. The three forward facing cameras (25) provide live images to the three projectors (32) in FIG. 22. The side facing cameras (31) provide related images to the individual window imaging systems (33) also located in the cabin (FIG. 22). This gives passengers the added dimension of lateral sensory input that contributes to the realism of the real-time portion of their experience. These images can be viewed on the individual passenger consoles on the flight deck (36) in FIGS. 22, 24, and 28. FIGS. 30 and 31 depict the viewing screens, located in the interior of the module (37), on which lift-off and turn and bank horizons are viewed when the cameras are operative. When the small servo (28) (see FIG. 7) is activated during left or right movement of the camera boom the hinged platform plate (24) tips up or down causing horizontal imaging as seen in FIG. 31. These camera movements are coordinated with the continuous charge hydraulic system (45) (FIG. 26) which gives the sensation of actual movement of the apparatus.

The continuous charge hydraulic system (45) under the module simulator allows simulations of left turns, right turns, climbs and dives. The movements of this system are subtle. The purpose of this system is not to shake people but rather to add just a slight movement in connection with visual cues that are generated on screens located throughout the ship. The continuous charge hydraulic system is found in different locations throughout the ship and is designed to begin immediate recharging after every release of pressure. The continuous charge hydraulic system units slowly return to the extended position automatically after every maneuver so as not to be noticed by the patrons (see FIG. 26).

The camera platform boom base (6) is a motorized rotating base using either hydraulic or electrical motors (29) to permit rotation of the upper base platform (30). The upper base platform has a servo ram (50) which lifts the camera boom system (5). Because of the way in which the boom system is hinged, it is only necessary to apply pressure to one of the two parallel support means (27).

The assembled apparatus has an entrance ramp (13) and exit ramp (23) (see FIG. 4) which connect to openings in the bottom of the entrance trailer (10) and exit trailer (18) respectively. These ramps are designed to operate in a cantilever fashion (see FIG. 17). During non-business hours these ramps are folded against the under side of the trailers (23). The entrance ramp system is a double ramp unit designed to compensate for the double floor involved in the simulator modules. The upper ramp (46) slides inside of the lower ramp (13) providing access to the floor of the orientation compartment (43). Both ramps (13 and 21) are hinged at the point where they meet with the floor of the modules.

The simulated hydraulic rams (14) are simply hollow tubes that telescope or slide inside of each other and are located under the assembled apparatus. The ramp system is operated by pulleys (48) and cables (47) attached to an opening means such as a garage door opener and balanced by a cantilevered system with the exit ramp (item 23, FIG. 29) located on the opposite side of the apparatus (18). Raising and lowering of the entrance ramp is accompanied by appropriate sounds that issue forth from a tactically positioned sound system (49). (See FIG. 17).

Figure 12:
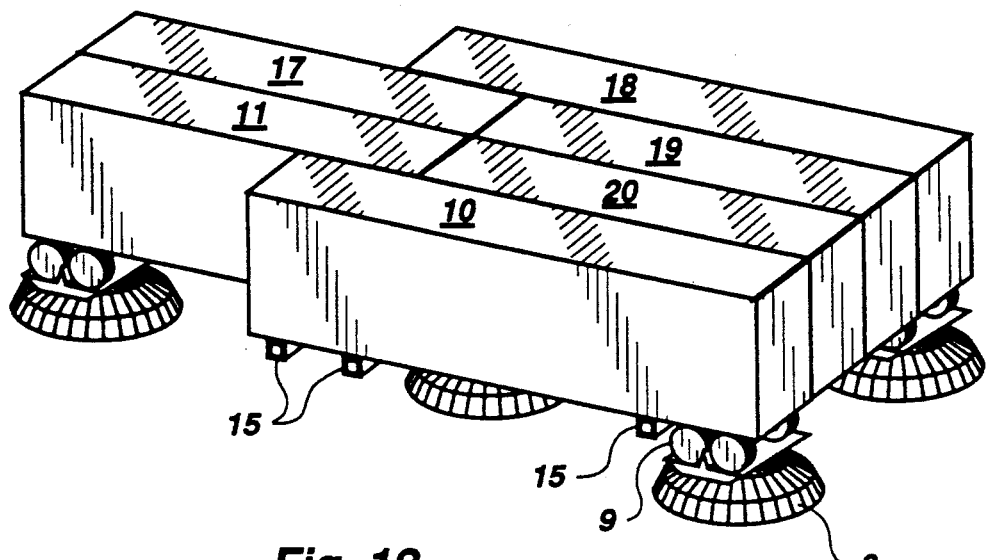
FIG. 12 depicts all of the exoskeleton removed except the support "thrusters".
Figure 13:
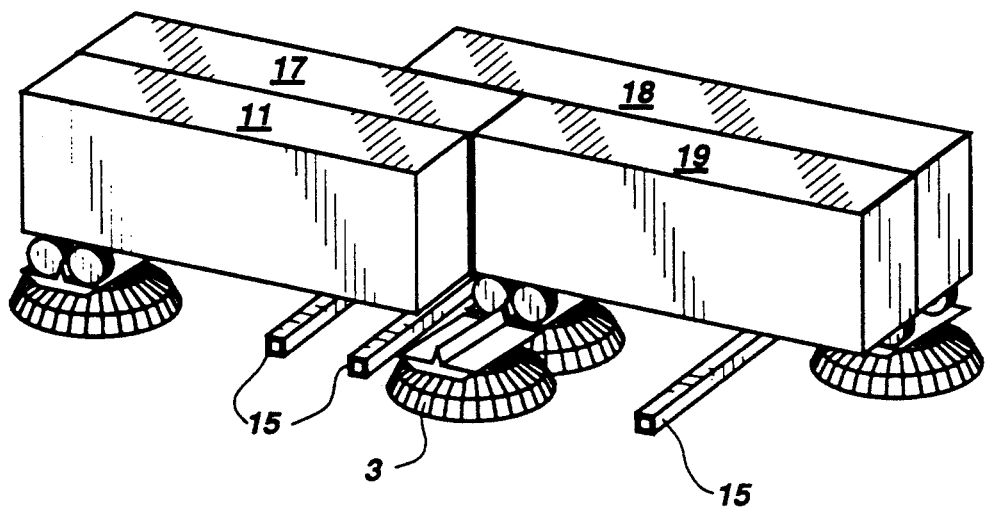
FIG. 13 shows the partially disassembled modules with support bars shown.

Support bars (15) connect the trailers to each other (see FIGS. 2, 4, 12 and 13) making it possible to either retract or eliminate the normal frontal stationary supports on the trailers. These support bars (15) also tie all six trailers into one unit thereby strengthening the total configuration. In FIG. 12 the support bar (15) on the right is firmly attached to the trailers (18 and 10) and supports the front end of trailers (19 and 20). The middle support bar is firmly attached to the end of trailers (19 and 20) and acts as the primary support for the front ends of the trailers (18 and 10) which are positioned in the opposite direction from trailers (11, 17, 19, and 20). The support bar (15) on the left is also firmly attached to trailers (18 and 10) and supports the front end of trailers (11 and 17). In addition to the support bars, the trailers are bolted together to maintain an overall rigid structure. (See FIGS. 12 and 13).

Figure 15:
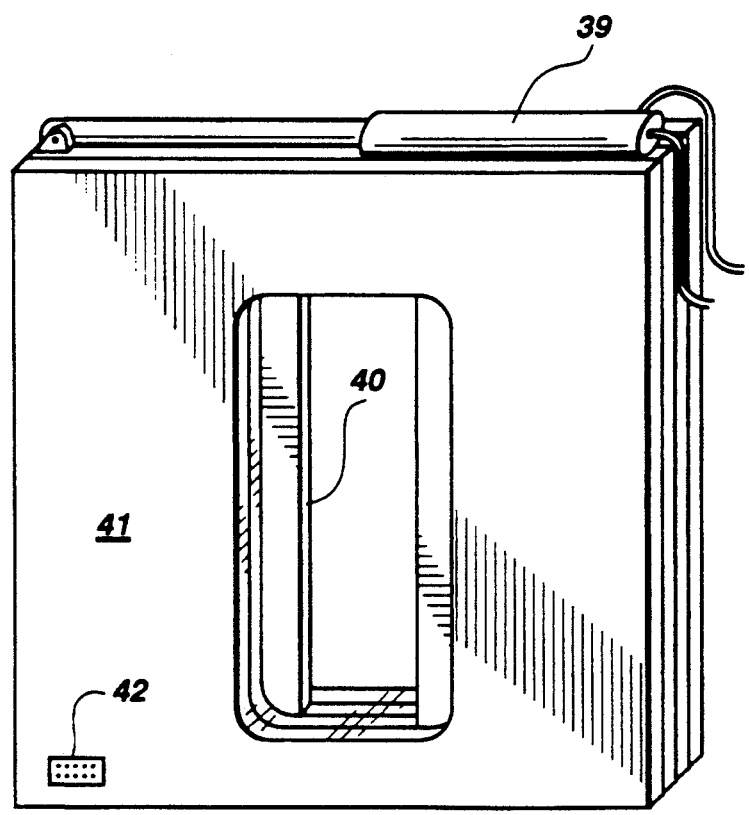
FIG. 15 shows the pressure door simulator.
Figure 16:
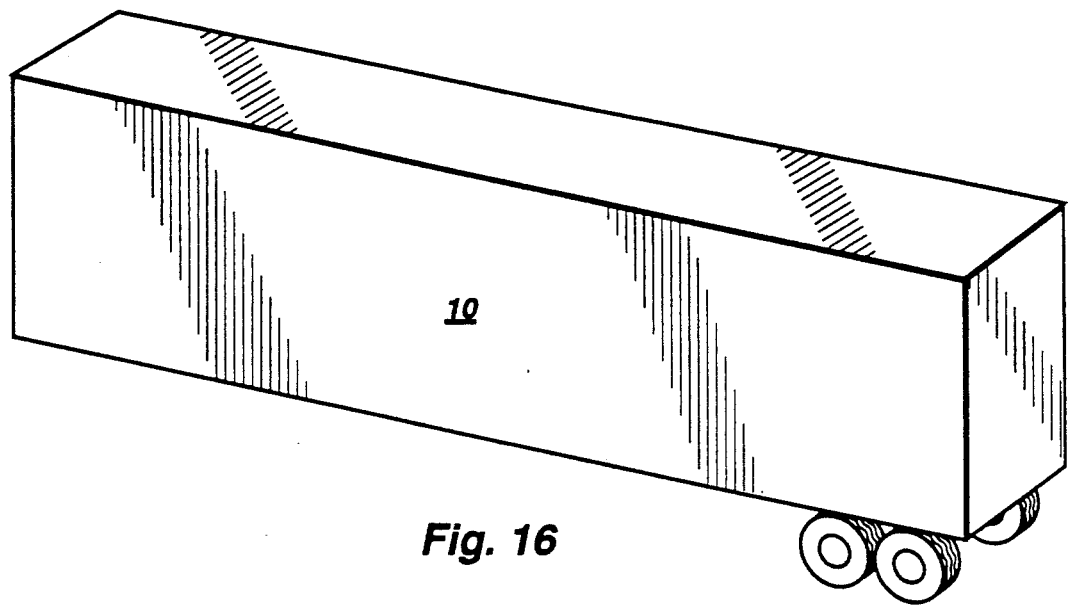
FIG. 16 depicts a detached trailer, without any exoskeleton, in which the modules are contained.

The pressure door simulator (41), found throughout the apparatus, consists of a hydraulically activated (39) double door (40) system accompanied by all of the simulated sounds (42) of opening and closing pressure doors. (See FIGS. 15, 17, and 18).

Figure 17:
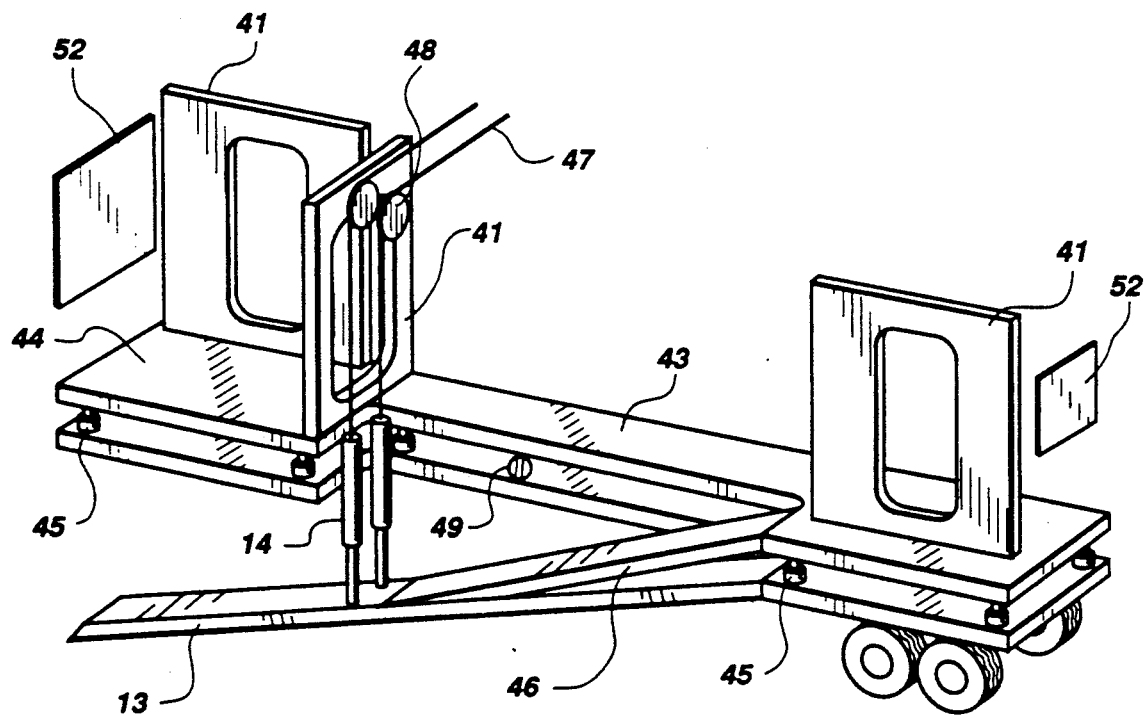
FIG. 17 shows a cutaway view of the trailer showing the entrance ramp system, various simulator pressure doors, and seating, storage, or control compartments.
Figure 18:
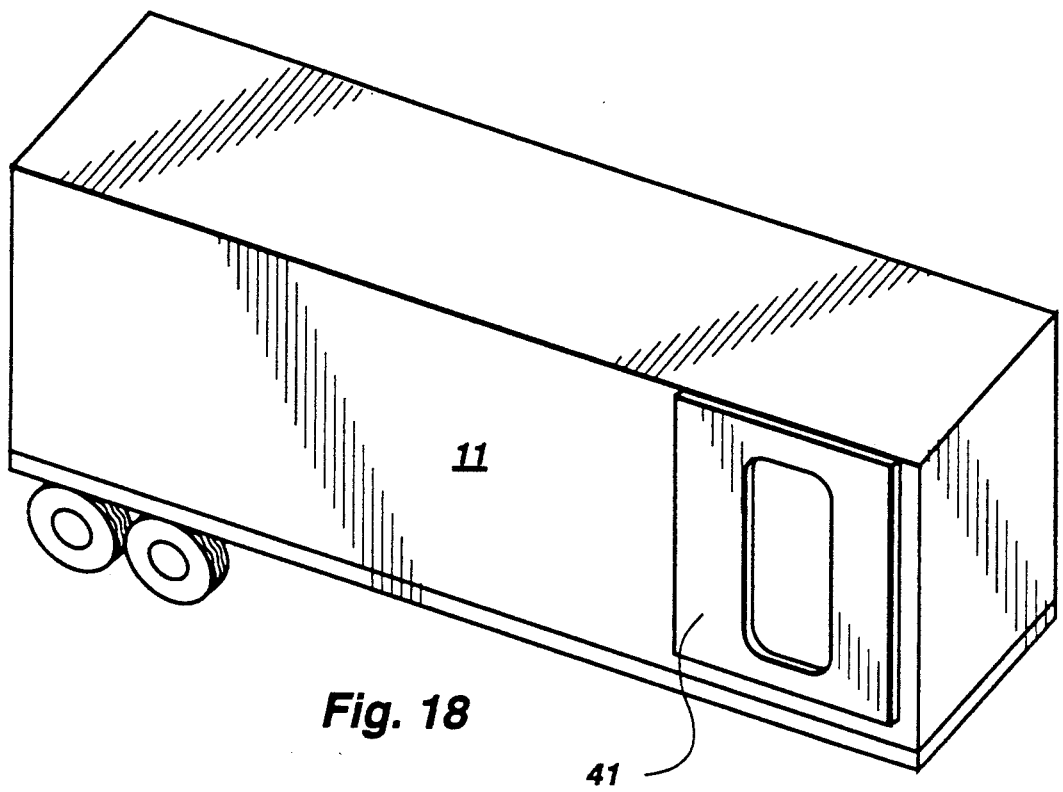
FIG. 18 depicts a smaller trailer with a pressure door simulator built into the side of the front side portion.
Figure 19:
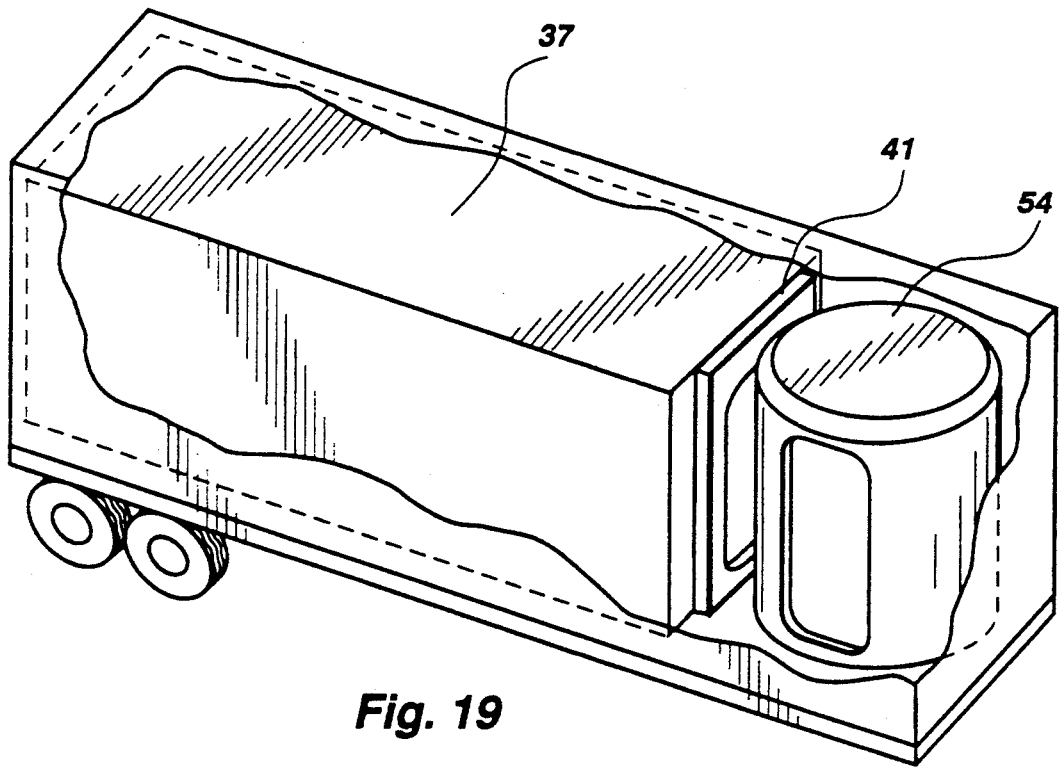
FIG. 19 shows a cutaway view of a smaller trailer containing a lateral transport elevator simulator and a cabin module for seating patrons.
Figure 20:
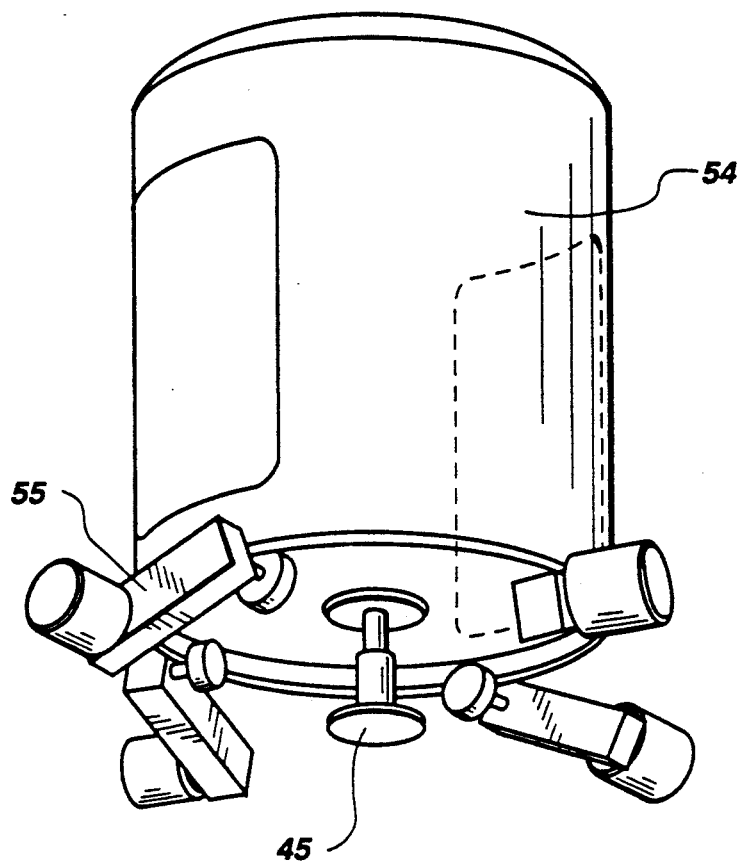
FIG. 20 depicts an elevator simulator having spring loaded electric motor drives and hydraulic rams that move the floor of the elevator simulator up and down to create the sensation of being lifted up to the modules of the apparatus.
Figure 21:
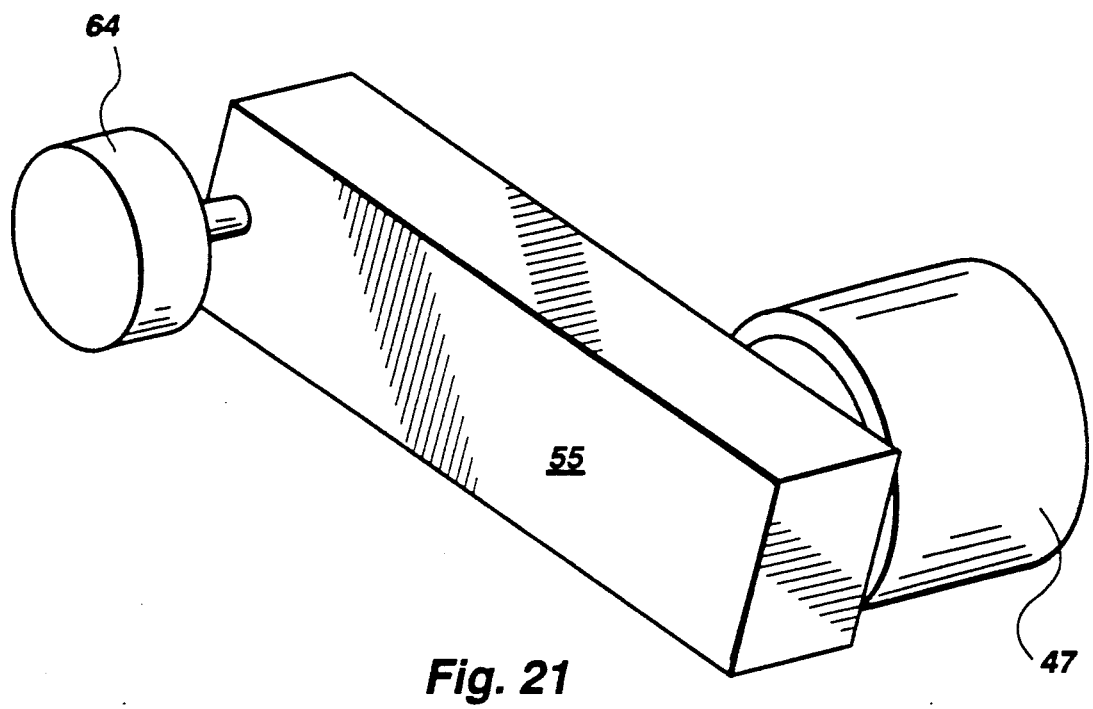
FIG. 21 shows a close-up of the spring loaded drive mechanism.
Figure 26:
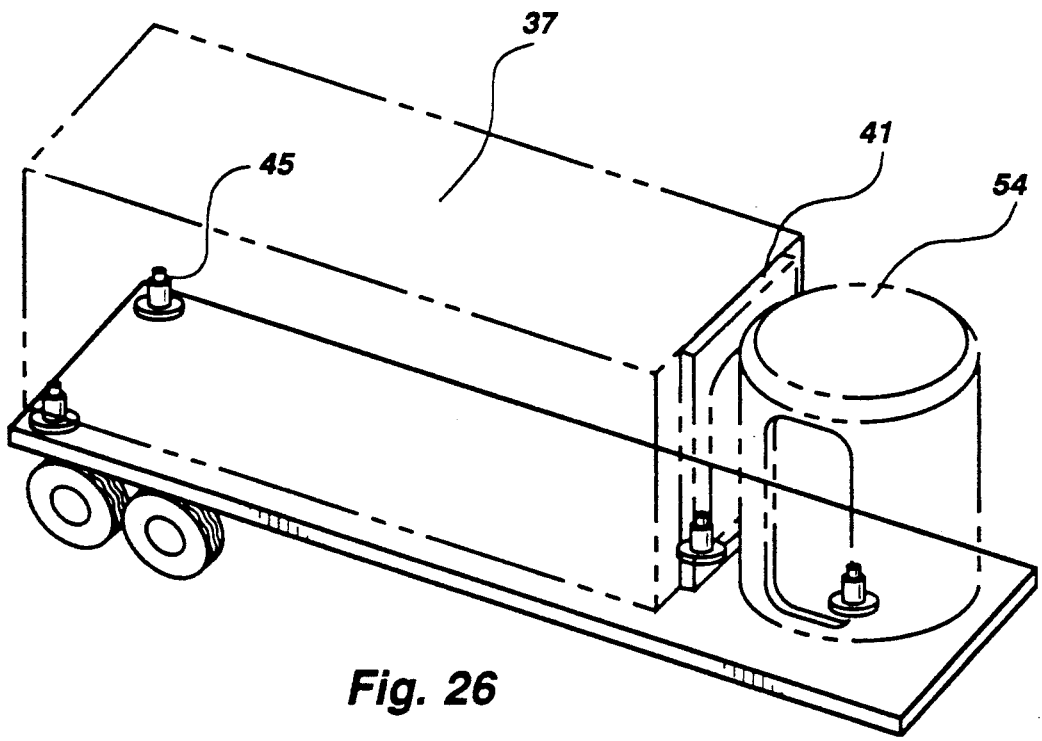
FIG. 26 depicts the cutaway of the multiple module trailer showing the positioning of the continuous charge hydraulic ram systems.

The orientation compartment (43) is designed to simulate "gravitic dampening." This is accomplished by the use of hydraulic rams (45) positioned under the floor of the compartment (see FIG. 17 and 26). The drop of the floor is minimal but effective. A similar effect is accomplished in the "decontamination" section (44) (see FIG. 17) that is part of the entrance trailer (10). Experiences in part of this decontamination section (44) and elevator simulator (54) are accompanied by video presentations projected on video screens (52) and (53) that orient and teach as the passengers pass through in groups of two or more. Each group is led by a steward who manually initiates the audio/video and special effects sequencing for each compartment.

The trailer module (11) contains a lateral transport elevator simulator (54). The purpose of this simulator is to create an illusion that the patrons are being transported laterally and vertically up to the module or flight deck (37) of the apparatus by the application of a system comprising spring loaded electric motor drives (55), hydraulic rams (45), large rubber rollers (64) and an electric motor (47). Four of these systems are used in the base of the lateral transport elevator simulator (54). The lateral transport elevator simulator (54) actually shuttles passengers in and out of any one of the four or more flight deck simulators (see FIG. 29). (See FIGS. 18, 19, 20, 21, 22, and 26).

The flight deck simulator module contains passengers seats (one of the consoles can accommodate a handicapped wheelchair if necessary) (See FIGS. 22 and 24) with consoles containing screens (36) where the apparatus's random access cartridge and tape files (58) (FIG. 27) as well as live video (25 and 31) of the exterior of the ship can be accessed. The touch sensitive console screens (36) allow the patrons to view scenes from a variety of continuous run cartridges and tapes. The patrons can also access fictional parts of the ship such as engineering, the galley, crew quarters, and others. The modules also contain pilot and co-pilot seats (56) and (57) where the pilot and co-pilot operate controls (63). The control (63) controls the camera platforms (24), the movement of the camera boom (5), boom base (6), and the continuous charge hydraulic system (45). Control (64) controls the special effects generator which interfaces with the real-time and pre-recorded special effects and video/computer special effects. The operations of all of the passengers' consoles including the take-off scenery as seen by the forward pointing cameras (25) on the camera platforms (24) are also controlled from the controls (63) and (64). The module contains a forward cockpit (35) with a forward screen (34) on which projectors (32) project the scenes from the forward pointing cameras (25). The module also contains simulated window video screens (33) which reproduce views from the side mounted cameras (31) on the camera platform (24). (See FIGS. 7, 22, 23, 30 and 31). Pre-recorded materials (58) (See FIG. 27) can be interfaced with the real-time video to simulate an actual take-off and journey which are viewed on the screens and consoles in the modules. The experience may also be enhanced with holographic and video special effects produced within the cockpit area (35) by means of VCR and other image producing equipment (59 and 60, FIG. 29).

The director of the entire apparatus is seated (51) where he/she can access the editing and control console (59). The director also controls which module is actively using the camera platforms (24), the movement of the camera boom (5), and boom base (6). The director controls heat and air conditioning throughout the apparatus in this area (51). The central computer is also located and operated in this area (51). Area (61) houses the electrical generators for the entire apparatus and area (62) houses the hydraulics reservoirs and hydraulics system computers.

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

I claim:

1. A portable multiple module simulator apparatus comprising:

multiple roadable trailers attached together to form a platform;

an exoskeleton covering enclosing said multiple roadable trailers;

multiple simulator modules formed on said roadable trailers;

said simulator modules having means for accommodating more than one person;

said simulator modules having means for providing visual, auditory, and motion stimuli which simulate various real-life and pre-recorded experiences;

said simulator modules having image gathering means attached to external supports with means that provide movement for said external supports;

viewing screens are located within said modules and connected to said external image gathering means to impart real-time point-of-access imagery from the environment surrounding said simulator.

2. The portable multiple module simulator apparatus of claim 1 wherein:

said visual means is a video display and said means for accommodating more than one person is a seating arrangement.

3. The portable multiple module simulator apparatus of claim 2 wherein:

an area in said modules simulates a lateral transport elevator that exits into said modules.

4. The portable multiple module simulator apparatus of claim 1 wherein:

said image gathering system comprises at least one video camera.

5. The portable multiple module simulator apparatus of claim 1 wherein:

said external supports for said image gathering means include platforms;

power means are mounted on said platforms to provide 360 degree rotation in all directions.

6. The portable multiple module simulator apparatus of claim 5 wherein boom mechanisms for raising and lowering said platforms are attached to said external supports and said platforms.

7. The portable multiple module simulator apparatus of claim 1 wherein:

hydraulic rams are located under floors of said modules and connected to said trailers to cause movement of said modules.

8. The portable multiple module simulator apparatus of claim 1 wherein:

one or more of said trailers contains or supports a retail marketing area.

9. A method for simulation of actual real-life experiences comprising:

positioning persons to experience said simulations in a portable multiple module simulator apparatus comprising:

multiple roadable trailers attached together to form a platform;

an exoskeleton covering enclosing said multiple roadable trailers;

multiple simulator modules formed on said roadable trailers;

said simulator modules having means for accommodating more than one person;

said simulator modules having means for providing visual, auditory, and motion stimuli which simulate various real-life and pre-recorded experiences;

said simulator modules having image gathering means attached to external supports with means that provide movement for said external supports;

viewing screens are located within said modules and connected to said external image gathering means to impart real-time point-of-access imagery from the environment surrounding said simulator;

moving said external image gathering means to view adjacent areas to provide point-of-access imagery and the appearance of relative movement between said person in said module and said adjacent areas;

conducting said point-of-access imagery into said modules and displaying it to said persons in said modules on the said viewing screens.

10. The method for simulation of actual real-life experiences as set forth in claim 9 including:

positioning said modules on roadable trailers;

joining said roadable trailers together to form a platform or support;

covering said joined roadable trailers with a shaped exoskeleton.

11. The method for simulation of actual real-life experiences as set forth in claim 10 including:

providing said modules with sound, sight, and motion means for additional simulation stimuli;

coordinating said point-of access imagery and said sound, sight, and motion means to provide a realistic representative of said real-life experiences.

* * * * *